United States Patent
Dierkhising et al.

(10) Patent No.: US 10,671,417 B2
(45) Date of Patent: Jun. 2, 2020

(54) SERVER OPTIMIZATION CONTROL

(71) Applicant: International Business Machines Corporation, Armonk, NY (US)

(72) Inventors: Lisa Dierkhising, Rochester, MN (US); Lee N. Helgeson, Rochester, MN (US); Justin K. King, Rochester, MN (US); Michelle A. Schlicht, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 387 days.

(21) Appl. No.: 15/498,391

(22) Filed: Apr. 26, 2017

(65) Prior Publication Data

US 2018/0314538 A1    Nov. 1, 2018

(51) Int. Cl.
| | | |
|---|---|---|
| *G06F 9/455* | (2018.01) | |
| *G06F 9/50* | (2006.01) | |
| *G06F 8/30* | (2018.01) | |

(52) U.S. Cl.
CPC .......... *G06F 9/45541* (2013.01); *G06F 8/31* (2013.01); *G06F 9/45558* (2013.01); *G06F 9/5016* (2013.01); *G06F 2009/45583* (2013.01); *G06F 2009/45591* (2013.01)

(58) Field of Classification Search
None
See application file for complete search history.

(56) References Cited

U.S. PATENT DOCUMENTS

| | | | |
|---|---|---|---|
| 8,381,208 B2 | 2/2013 | Burke et al. | |
| 8,468,535 B1* | 6/2013 | Keagy | G06F 8/63 718/104 |
| 9,032,191 B2* | 5/2015 | Muff | G06F 9/45558 712/239 |
| 9,251,090 B1* | 2/2016 | Borthakur | G06F 12/1009 |
| 9,418,088 B1 | 8/2016 | Noll | |
| 9,459,849 B2* | 10/2016 | Bates | G06F 9/4552 |
| 9,459,850 B2* | 10/2016 | Bates | G06F 9/4552 |
| 9,472,084 B1 | 10/2016 | Barak et al. | |
| 9,558,081 B2* | 1/2017 | Borthakur | G06F 12/1009 |
| 9,720,661 B2* | 8/2017 | Gschwind | G06F 8/41 |

(Continued)

OTHER PUBLICATIONS

Moshref, Masoud, et al. "Scalable rule management for data centers." Presented as part of the 10th {USENIX} Symposium on Networked Systems Design and Implementation ({NSDI} 13). 2013. (Year: 2013).*

(Continued)

*Primary Examiner* — Matthew J Brophy
(74) *Attorney, Agent, or Firm* — Martin & Associates, LLC; Bret J. Petersen (57) ABSTRACT

An optimizer controller controls a hypervisor optimizer to regulate operation of the optimizer to insure the optimizer does not negatively impact operation of software applications. The optimizer controller monitors applications and application performance to determine whether to turn on or off specific optimization features for specific applications. The optimizer may also notify a user of potential problems. The optimizer controller may utilize optimization rules for specific applications that set the conditions for controlling the optimizer. The rules may be dynamically changed based on observed performance and trends of the applications.

8 Claims, 4 Drawing Sheets

(56) References Cited

U.S. PATENT DOCUMENTS

| | | | | |
|---|---|---|---|---|
| 9,720,662 | B2* | 8/2017 | Gschwind | G06F 8/41 |
| 9,720,846 | B2* | 8/2017 | Tsirkin | G06F 12/1081 |
| 9,727,361 | B2* | 8/2017 | Anand | G06F 9/45558 |
| 9,733,965 | B2* | 8/2017 | Anand | G06F 9/45558 |
| 9,747,122 | B2* | 8/2017 | Serebrin | G06F 9/45558 |
| 2003/0191730 | A1* | 10/2003 | Adkins | G06N 5/04 706/47 |
| 2006/0206891 | A1* | 9/2006 | Armstrong | G06F 9/45537 718/1 |
| 2012/0054466 | A1* | 3/2012 | Devendran | G06F 12/10 711/207 |
| 2012/0054740 | A1* | 3/2012 | Chakraborty | G06F 9/45558 718/1 |
| 2014/0189682 | A1* | 7/2014 | Crudele | G06F 9/45558 718/1 |
| 2015/0143149 | A1* | 5/2015 | Oney | G06F 21/53 713/321 |
| 2015/0169350 | A1* | 6/2015 | Anand | G06F 9/45558 718/1 |
| 2015/0205587 | A1* | 7/2015 | Bates | G06F 9/4552 717/148 |
| 2015/0205588 | A1* | 7/2015 | Bates | G06F 9/4552 717/145 |
| 2015/0277863 | A1* | 10/2015 | Gschwind | G06F 8/41 717/158 |
| 2015/0277869 | A1* | 10/2015 | Gschwind | G06F 8/41 717/153 |
| 2016/0147619 | A1* | 5/2016 | Borthakur | G06F 12/1009 714/768 |
| 2018/0239629 | A1* | 8/2018 | Tsirkin | G06F 9/45558 |
| 2018/0255122 | A1* | 9/2018 | Hu | H04L 47/72 |

OTHER PUBLICATIONS

Jin, Xin, et al. "Covisor: A compositional hypervisor for software-defined networks." 12th {USENIX} Symposium on Networked Systems Design and Implementation ({NSDI} 15). 2015. (Year: 2015).*

Jin, Xin, Jennifer Rexford, and David Walker. "Incremental update for a compositional SDN hypervisor." Proceedings of the third workshop on Hot topics in software defined networking. ACM, 2014. (Year: 2014).*

Zaharia, Matei, et al. "Apache spark: a unified engine for big data processing." Communications of the ACM 59.11 (2016): 56-65. (Year: 2016).*

Mavridis, Ilias, and Helen Karatza. "Performance evaluation of cloud-based log file analysis with Apache Hadoop and Apache Spark." Journal of Systems and Software 125 (2017): 133-151. (Year: 2017).*

Hadri et al., "Mining Software Usage with the Automatic Library Tracking Database (ALTD)", 2013 International Conference on Computational Science, Procedia Computer Science 18, p. 1834-1843, 2013.

Ganju, Siddha, "CERN seeks to predict new and popular data sets", printed from https://www.oreilly.com/ideas/cern-seeks-to-predict-new-and-popular-data-sets, Mar. 22, 2016.

Quora, "What are the main problems when deploy Apache Spark into virtualized environments such as Xen or KVM?", printed from https://www.quora.com/What-are-the-main-problems-when-deploy-Apache-Spark-into-virtualized-environments-such-as-Xen-or-KVM, 2015.

Stackoverflow, "Apache Spark standalone mode: number of cores", printed from http://stackoverflow.com/questions/28119958/apache-spark-standalone-mode-number-of-cores, 2015.

Stackoverflow, "Can SPARK use multicore properly?", printed from http://stackoverflow.com/questions/29716949/can-spark-use-multicore-properly, 2015.

* cited by examiner

SERVER OPTIMIZATION CONTROL

BACKGROUND

1. Technical Field

This disclosure generally relates to computer optimization, and more specifically relates to a system and method for controlling software layer optimization on a server to prevent the optimization from negatively impacting operation of applications.

2. Background Art

Computer system designers and operators seek to optimize computer systems at many different levels. For example, computer optimization may be performed at the assembly language level, compile level, source code level, program level and design level, etc. A hypervisor may include an optimizer to optimize memory allocation. A hypervisor is a partition management system that runs on a computer server. The hypervisor provides a virtual operating platform for virtual machines or logical partitions for deploying applications or workloads.

The hypervisor may utilize a software layer optimizer to optimize computer resources such as computer memory and processor floating point units. The optimizer in the hypervisor may include various components to use different techniques to optimize the computer resources. When software workloads or applications are deployed, these various optimizer components may sometimes actually negatively impact the operation of the application while attempting to optimize server performance. Big data applications are particularly vulnerable to some optimization features.

BRIEF SUMMARY

An optimizer controller controls a hypervisor optimizer to regulate operation of the optimizer to insure the optimizer does not negatively impact operation of software applications. The optimizer controller monitors applications and application performance to determine whether to turn on or off specific optimization features for specific applications. The optimizer may also notify a user of potential problems. The optimizer controller may utilize optimization rules for specific applications that set the conditions for controlling the optimizer. The rules may be dynamically changed based on observed performance and trends of the applications.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and.

DETAILED DESCRIPTION

The disclosure and claims herein relate to a system and method for controlling a hypervisor optimizer to regulate operation of the optimizer to insure the optimizer does not negatively impact operation of software applications or workloads. An optimizer controller monitors applications and application performance to determine whether to turn on or off specific optimization features for specific applications. The optimizer controller may utilize optimization rules for specific applications that set the conditions for controlling the optimizer. The rules may be dynamically changed based on observed performance and trends of the applications.

Figure 1:
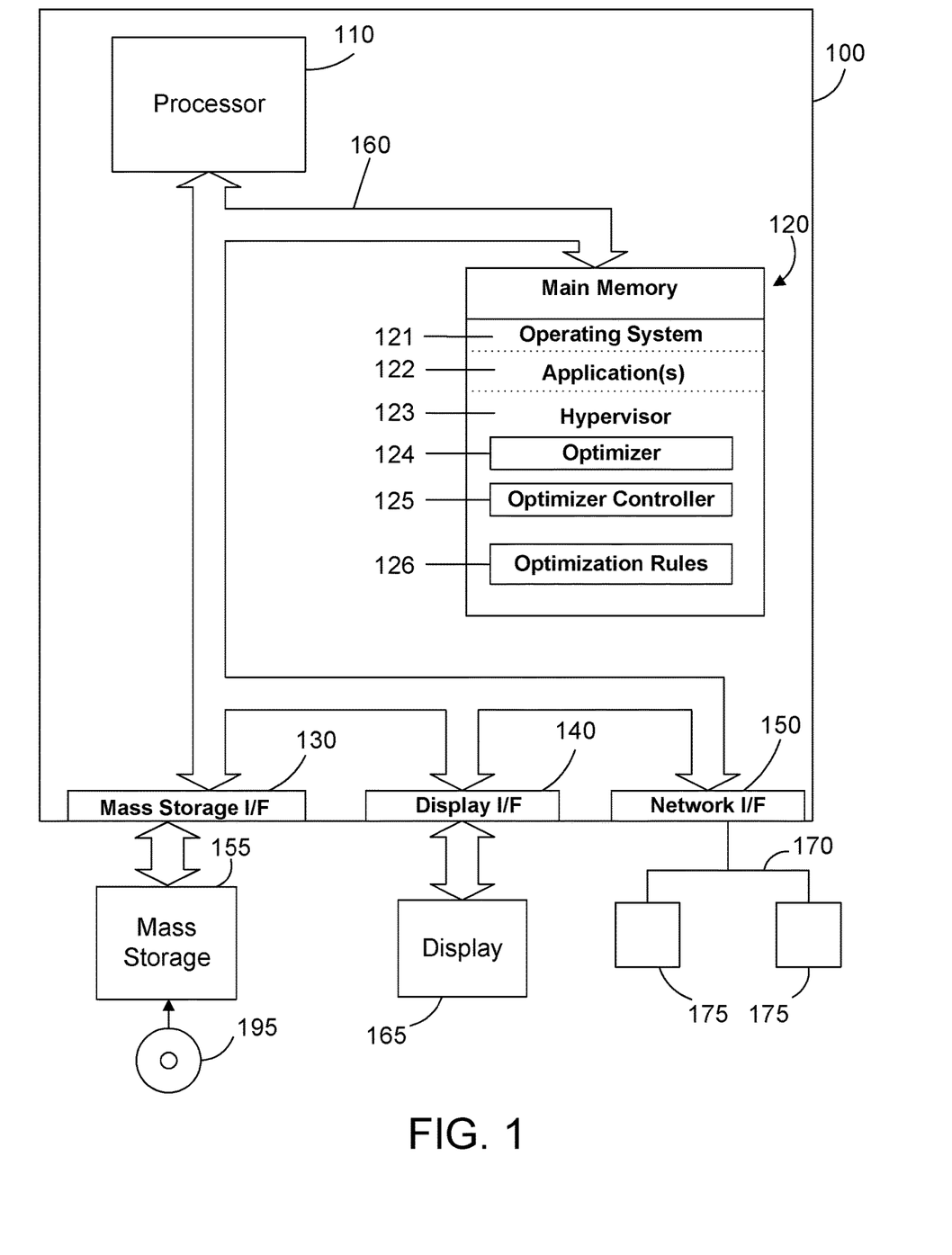
FIG. 1 is a block diagram a computer system with an optimizer controller that controls a hypervisor optimizer to regulate operation of the optimizer to insure the optimizer does not negatively impact operation of software applications.

Referring to FIG. 1, a computer system 100 is one suitable implementation of a computer system that is capable of performing the computer operations described herein including an optimizer controller that controls a hypervisor optimizer to regulate operation of the optimizer to insure the optimizer does not negatively impact operation of software workloads as described herein. Computer system 100 is a computer which can run multiple operating systems including the IBM i operating system. However, those skilled in the art will appreciate that the disclosure herein applies equally to any computer system, regardless of whether the computer system is a complicated multi-user computing apparatus, a single user workstation, laptop, phone or an embedded control system. As shown in FIG. 1, computer system 100 comprises one or more processors 110. The computer system 100 further includes a main memory 120, a mass storage interface 130, a display interface 140, and a network interface 150. These system components are interconnected through the use of a system bus 160. Mass storage interface 130 is used to connect mass storage devices with a computer readable medium, such as mass storage 155, to computer system 100. One specific type of mass storage 155 is a readable and writable CD-RW drive, which may store data to and read data from a CD-RW 195. Some mass storage devices may have a removable memory card or similar instead of the CD-RW drive.

Main memory 120 preferably contains an operating system 121. Operating system 121 is a multitasking operating system known in the industry as IBM i; however, those skilled in the art will appreciate that the spirit and scope of this disclosure is not limited to any one operating system. The memory 120 further includes one or more applications 122. The memory 120 also includes a hypervisor 123 that includes an optimizer 124, an optimizer controller 125 and optimization rules 126.

Computer system 100 utilizes well known virtual addressing mechanisms that allow the programs of computer system 100 to behave as if they only have access to a large, single storage entity instead of access to multiple, smaller storage entities such as main memory 120 and mass storage 155. Therefore, while operating system 121, applications 122, hypervisor 123, optimizer 124, optimizer controller 125, and the optimization rules 126 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 121 and the hypervisor 123 and later executes the program instructions that make up the applications 122 as directed by a user.

Although computer system 100 is shown to contain only a single processor and a single system bus, those skilled in the art will appreciate that the system may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150, e.g. web client based users.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
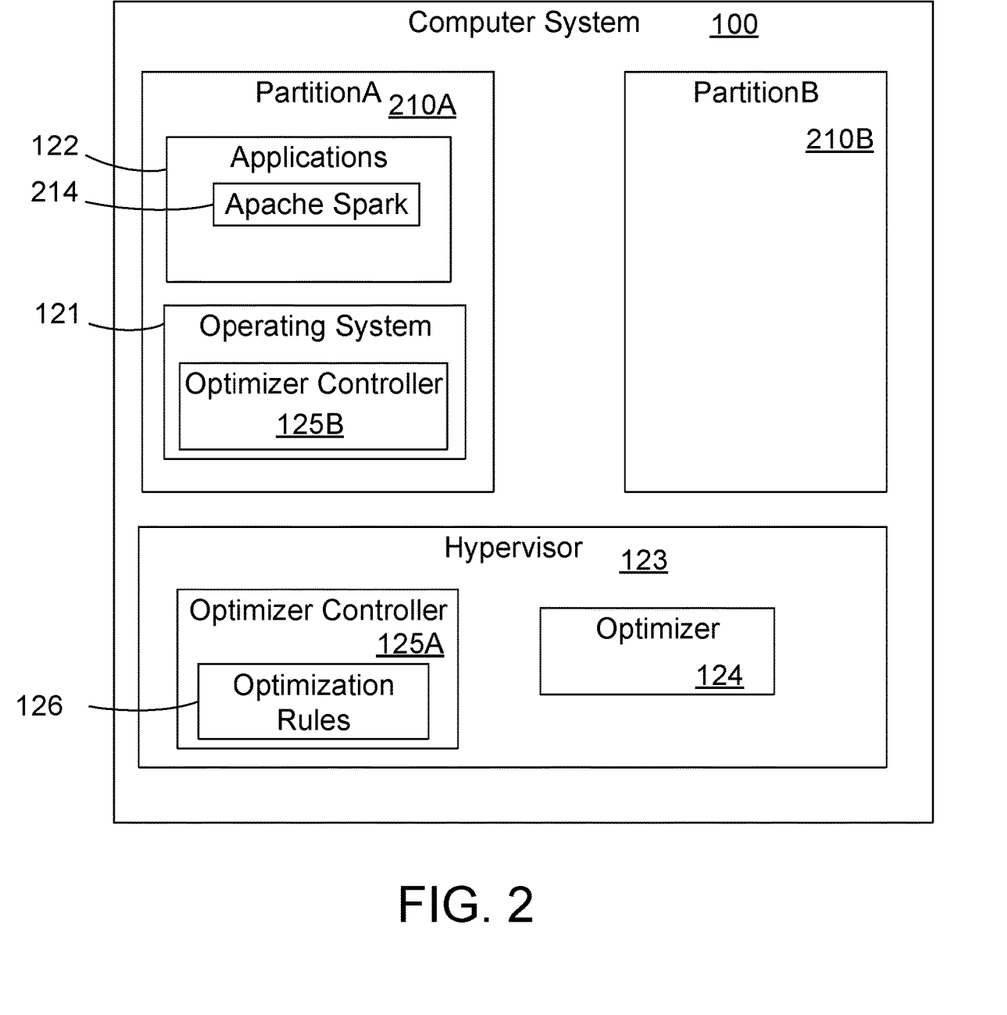
FIG. 2 illustrates another simplified block diagram of a system with an optimizer controller that controls a hypervisor optimizer to regulate operation of the optimizer.

FIG. 2 illustrates a simplified example of a computer system 100 described above with reference to FIG. 1. The computer system 100 includes one or more logical partitions collectively referred to as partitions 210. In the illustrated example, the computer system 100 includes partitionA 210A and partitionB 210B. The partitions 210 are created and managed by the hypervisor 123. A hypervisor is one suitable example of partition manager system software that allocates and controls the partitions 210. The hypervisor 123 runs on the computer system 100 and provides a virtual operating platform for virtual machines or logical partitions as known in the prior art. The hypervisor 123 also virtualizes the system hardware to provide virtualized hardware resources to the partitions. The system hardware that is virtualized may include memory, computer processing units and I/O devices as known in the prior art.

Again referring to FIG. 2, the computer system 100 includes an optimizer controller 125 with one or more portions which are collectively referred to as optimizer controller 125. In the illustrated example, a first portion 125A of the optimizer controller is located in or a part of the hypervisor 123. A second portion 125B of the optimizer controller 125 may be located in or be a part of the operating system 121. The second portion 125B of the optimizer may be used to monitor applications in the partition as described further below. The optimizer controller 125 controls the optimizer 124 as described further below. The optimizer controller 125 uses one or more optimization rules 126 to determine how to control the optimizer 124.

As introduced above, the computer system 100 includes one or more partitions. In the illustrated example, partitionA 210A includes an operating system 121. The partition may have also one or more applications 122 within the partition. The applications 122 are sometimes also referred to as workloads. In the illustrated example, the applications 122 in the partition 210A include a copy of Apache Spark 214. "Apache Spark" is a trademark owned by Apache Software Foundation. Apache Spark is an open-source cluster computing framework which provides an interface for programming entire clusters with implicit data parallelism and fault-tolerance. The optimizer 124 may attempt to optimize the partition 210A containing the Apache Spark application 214 using a common optimization technique. However, the optimization may actually have detrimental effects on the Apache Spark application 214. The optimizer controller 125 detects the presence of the Apache Spark application 214 and controls the optimizer 124 according to the optimization rules to prevent the optimization from conflicting with the operation of application. The optimizer controller 125 modifies the operation of the optimizer 124 by turning on or off specific optimization for specific applications according to the optimization rules 126 as described further in the examples below.

The optimizer 124 may use one or more optimization features or techniques to optimize the partitions 210. Some common optimization techniques include Hardware floating point validation (HFPV), Memory Affinity Optimization (MAO), Virtual Machine Memory Paging (VMMP) and Dynamic System Optimizer (DSO). The optimizer controller 125 may control each of these techniques for specific applications as described in the optimization rules 126. Each of these optimization techniques will be briefly described in the following paragraphs.

Hardware floating point validation (HFPV) is an optimization technique that dynamically runs tests on a processor's floating point units. It may be desirable to turn off the HFPV technique when a floating-point-intensive application is detected based on a rule where the rule may include a performance measurement. For example, if the optimizer 124 enables HFPV and the application performance drops by more than a prescribed amount (e.g. 5%), then the optimizer controller 125 could then turn off HFPV and update the optimization rules 126 to ensure HFPV is disabled for the appropriate application.

Memory affinity optimization (MAO) is an optimization technique that moves memory data as close to the chip as possible so that the chip does not have to query other chips for memory data. MAO is an expensive operation in terms of server resources because it takes time to move memory data and references to the memory. MAO could be turned off if it is affecting a memory-intensive application or workload, or it could be turned on if the application is long-running and the optimizer determines that a large number of stores are reaching to remote nodes such as non-uniform memory access nodes (NUMA).

Virtual machine memory paging (VMMP) is an optimization technique that shares a physical pool of memory and moves less-used pages out to disk. If VMMP is running on a partition with a specified application, the optimization controller could turn off or on the VMMP optimization based on an optimization rule for the specified application.

DSO is an optimization technique in the Advanced Interactive eXecutive (AIX) operating system by International Business Machines Corporation. DSO is thus an operating system level optimizing tool. DSO could be turned on/off as appropriate by the optimizer controller. For example, for an application that does its own memory management (rather than rely on OS management) it could be advantageous for the optimizer controller to turn off DSO optimization.

Figure 3:
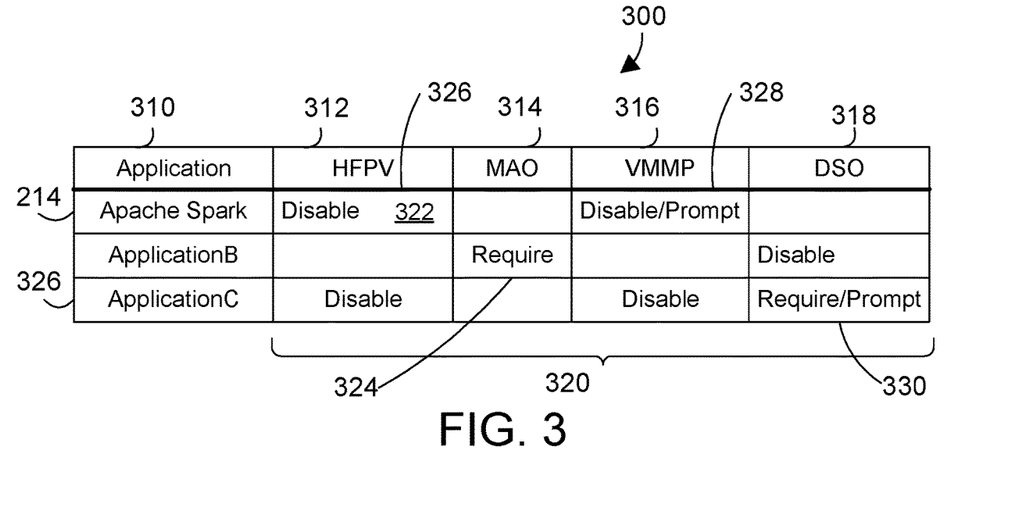
FIG. 3 is a table of rules for the optimizer controller to regulate the operation of the optimizer.

FIG. 3 illustrates some examples of optimization rules 126 that can be used by the optimizer controller 125 to control the optimizer for various applications. FIG. 3 shows the optimization rules in a table format to illustrate how specific optimization rules can be set for specific applications. The table of optimization rules 300 include an application column 310 which includes some example applications including the Apache Spark application 214 introduced above. The table of optimization rules 300 further includes columns for several optimization techniques including HFPV 312, MAO 314, VMMP 316 and DSO 318. The table 300 may include an optimization rule 320 for each corresponding application 310 and each optimization technique 312, 314, 316, 318. In the illustrated example, the application Apache Spark 214 has a disable rule for the HFPV 312 and the VMMP 316 optimization techniques. A disable rule indicates to disable an optimization technique for a corresponding application. For example, the disable rule 322 indicates to disable HFPV optimization 312 for the Apache Spark application 214. A require rule 324 indicates that an application runs better with the corresponding optimization feature turned on. In response to the require rule the optimization controller takes action to enable the optimization feature and/or alert the user to the feature. For example, the require rule 324 indicates to require DSO optimization for ApplicationC 326. The lack of an optimization rule, as indicated by an empty location in the table, indicates a "don't-care" scenario for the optimization controller. In such cases the optimization controller allows the optimizer to use default optimization techniques as known in the prior art for the application and optimization technique corresponding to the empty location.

The optimizer controller 125 may also interact with a user based on the optimization rules 126. For example, the optimizer controller 125 may notify a user regarding potential effects of a user selection of an optimization feature. Then, based on a rule, the optimizer controller may prompt the user whether to continue with the optimization feature. A disable/prompt rule 328 indicates to the optimizer controller to prompt the user whether to disable the optimization feature. A require/prompt rule 330 indicates to the optimizer controller to prompt the user whether to require the optimization feature. The following rule is an example of the require/prompt rule 330 shown in FIG. 3. This rule could be used by the optimizer controller 125 to notify a user of potential adverse effects of using the optimization feature when the user selects DSO optimization for ApplicationB.

if(DSO_SELECTED_BY_USER_FOR_APPLICATIONB): PROMPT_USER

Similarly, the following rule is an example of the disable/prompt rule 328. This rule could be used by the optimizer controller 125 to notify a user of potential adverse effects of the optimization when the user selects VMMP optimization. and then prompts the user's selection if the partition loading is greater than 80 percent.

--- if(VMMP_SELECTED_BY_USER_FOR_APPLICATIONB) AND if (PARTIION_LOADING>80%): NOTIFY USER AND PROMPT_USER_SELECTION AND disable(VMMP)

---

In the above examples, the user is prompted whether to continue with an optimization feature based on the optimization rules. After making this prompt to the user, the optimization controller may allow the user the option to turn off similar prompts for this optimization feature in the future. If the user selects to turn off future prompts, the optimization controller will disregard the "prompt" portion of the optimization rule for that specific application and optimization feature. This effectively converts the rule to a non-prompt version of the rule. For example, if the user selects to no longer receive future prompts for the disable/prompt rule 328, then this action effectively converts the rule 328 to a disable rule. The selection to no longer receive future prompts for a rule may be reversed if the rule is updated as described below. For example, if a rule is updated to change from disable to require an optimization feature, the user's prior selection to turn off prompts for this rule is ignored and the user is again prompted for this rule. After this prompt, the user can then be allowed to again turn off future prompts for this rule.

In FIG. 3 the optimization rules were stored in a table format to provide specific optimization rules for specific applications. Alternatively, the optimization rules 126 (FIG. 2) could be represented as a list of logical rules stored at a location available to the optimizer controller 125. For example, the following list of rules could be used by the optimizer controller 125 to implement similar rules to those shown in FIG. 3.

if(SPARK): disable(HFPV)
    if(SPARK): disable(VMMP)
    if(ApplicationB): require(MAO)
    if(ApplicationB): disable(DSO)
    if(ApplicationC): disable(HFPV)
    if(ApplicationC): disable(VMMP)
    if(ApplicationC): require(DSO)

In the previous examples, the optimization rules were for a specific application. In other examples, the optimization rules could be directed to a specific type of application or an application that has a specific status. The optimization rule could also use a combination of application type and status of the application or the partition. For example, status of the partition could include a maximum loading of the partition. The following list of rules could be used by the optimizer controller 125.

--- if(LATENCY_SENSITIVE_APPLICATION): require(MAO)
if(LATENCY_SENSITIVE_APPLICATION and
PARTIION_LOADING>80%) : require(MAO)

---

The optimizer controller may also update the optimization rules based on performance trends of the application and the partition. In a partition there are parameters such as hardware counters that can be gathered by either the operating system or the hypervisor to measure partition performance. These parameters can be used by the optimizing controller to update the optimization rules. For example, in some systems specific registers can be used to check processor utilization. If these registers indicate a large drop (e.g., 5%) in processor utilization at the same time that an optimization is enabled, the optimization rules could be updated to disable that optimization feature for the affected application. Updating the rules could also be done using application specific performance. The optimizing controller could check performance of a specific application using a request to the application to determine a performance aspect of the application. Alternatively, the optimizing controller could look at IO traffic such as network latency/throughput or disk latency/throughput to determine application performance.

An example for controlling optimization on a server to prevent the optimization from negatively impacting operation of applications will now be described with reference to FIG. 2 and FIG. 3. As introduced above, the partition 210A includes a copy of Apache Spark 214. The optimizer 124 may attempt to optimize the partition 210A containing the Apache Spark application 214 using a common optimization technique. However, the optimization may actually have detrimental effects on the application. The optimizer controller 125 detects the presence of the Apache Spark application 214 and controls the optimizer 124 according to the optimization rules 126 to prevent optimizations that conflict with the operation of the application. The optimizer controller 125 modifies the operation of the optimizer 124 by turning on or off specific optimization for specific applications according to the optimization rules 126. The optimizer controller may detect the presence of the Apache Spark application using a portion of the optimizer controller in the operating system on the partition. The portion of the optimizer controller in the operating system may detect the presence of the Apache Spark application by detecting Apache Spark application libraries. For example, detecting the application libraries could be done by inserting a break point into the libraries to notify the optimizer controller that the library is being used.

Figure 4:
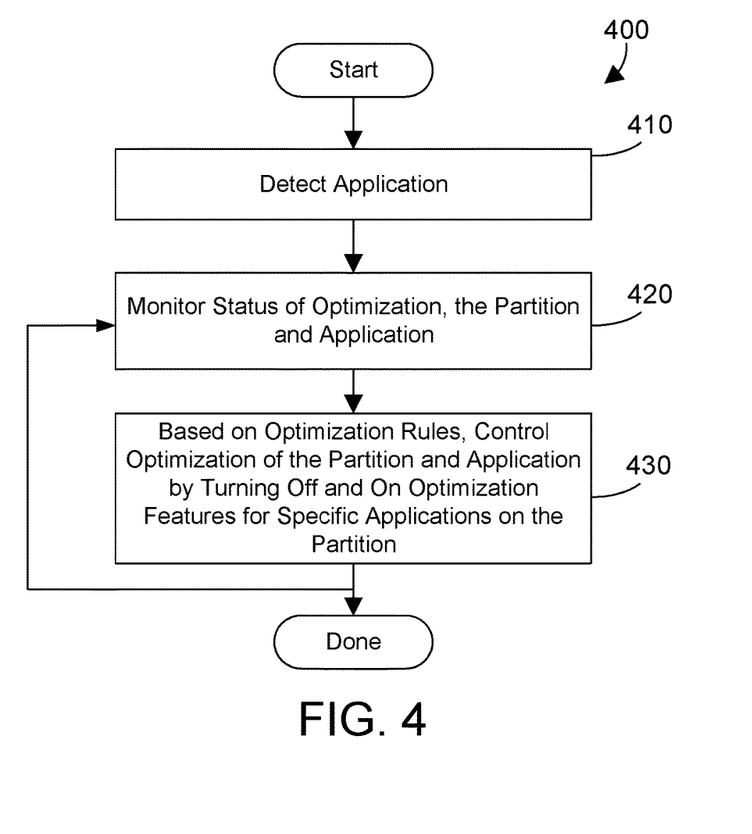
FIG. 4 is a flow diagram of a method for controlling software layer optimization on a server to prevent the optimization from negatively impacting operation of applications.

Referring to FIG. 4, a method 400 shows one suitable example for controlling software layer optimization on a server to prevent the optimization from negatively impacting performance of applications. Portions of method 400 are preferably performed by optimizer controller 125A and 125B shown in FIG. 1. First, detect the presence of a specific application or workload (step 410). Next, monitor the status of optimization, the partition and the application (step 420). Based on optimization rules, control optimization of the partition and application by turning off and on optimization features for a specific application in the partition. (step 430). Method 400 may then continue by returning to step 420. Note the features turned off and on in step 430 can include any suitable optimization features or technique, including the optimization techniques disclosed below and others.

Figure 5:
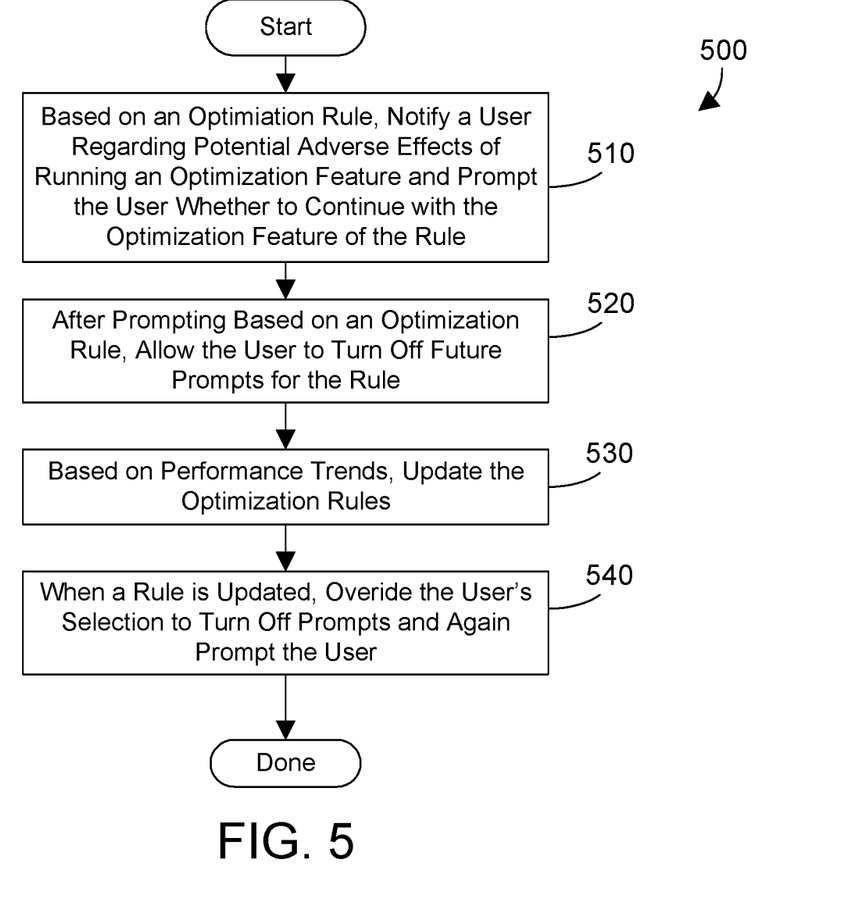
FIG. 5 is a flow diagram of a specific method for step 430 in FIG. 4.

FIG. 5 shows one suitable example of a method 500 to control optimization of the partition and application based on optimization rules. Method 500 thus shows a suitable method for performing step 430 in method 400 in FIG. 4. First, based on optimization rules, notify a user regarding potential effects of running an optimization feature and prompt the user whether to continue with the optimization feature of the rule (step 510). After prompting the user based on an optimization rule, allow the user to turn off future prompts for the rule (step 520). Based on performance trends of the partition, update the optimization rules (step 530). When a rule is updated, override the user's selection to turn off prompts to again prompt the user (step 540). The method 500 is then done.

The disclosure and claims herein relate to a system and method for controlling a hypervisor optimizer to regulate operation of the optimizer to insure the optimizer does not negatively impact operation of software workloads. The optimizer controller monitors workloads and workload performance to determine whether to automatically control specific optimization techniques for specific workloads to lessen the impact of optimization on applications such as big data applications.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A computer server comprising:
   at least one processor;
   a memory coupled to the at least one processor;
   a hypervisor residing in the memory and executed by the at least one processor that manages a logical partition on the computer server, the hypervisor comprising an optimizer for optimizing the computer server;
   a plurality of optimization rules residing in the memory;
   an optimizer controller residing in the memory and executed by the at least one processor that detects an application and based on at least one of the plurality of optimization rules controls optimization of the partition by controlling optimization features of the optimizer; and
   wherein the application is Apache Spark and the optimizer controller detects the presence of the Apache Spark application by detecting Apache Spark application libraries on the logical partition.

2. The computer server of claim 1 wherein the optimization controller controls optimization features of the optimizer by turning on and off optimization techniques for the detected application.

3. The computer server of claim 1 wherein the optimization controller further monitors a status of the partition and a status of the detected application and based on performance trends updates the optimization rules.

4. The computer server of claim 1 wherein the optimization controller notifies a user regarding potential adverse effects of a user selection of optimization features based on the optimization rules.

5. The computer server of claim 4 wherein the optimization controller prompts the user whether to continue with optimization features based on the optimization rules.

6. The computer server of claim 1 wherein optimization rules include a rule for a specific status of the detected application and a corresponding optimization technique.

7. The computer server of claim 1 wherein the optimization rules include a rule for a specific application and a corresponding status of the application.

8. The computer server of claim 1 wherein the optimization rules include a rule for a specific application and a corresponding status of the logical partition and wherein the status of the logical partition includes a maximum loading of the logical partition.

* * * * *